July 2, 1963   L. R. BORN, JR., ETAL   3,095,673
WORKPIECE GAUGING STOP FOR METAL CUT-OFF MACHINE
Filed Aug. 9, 1961   3 Sheets-Sheet 1
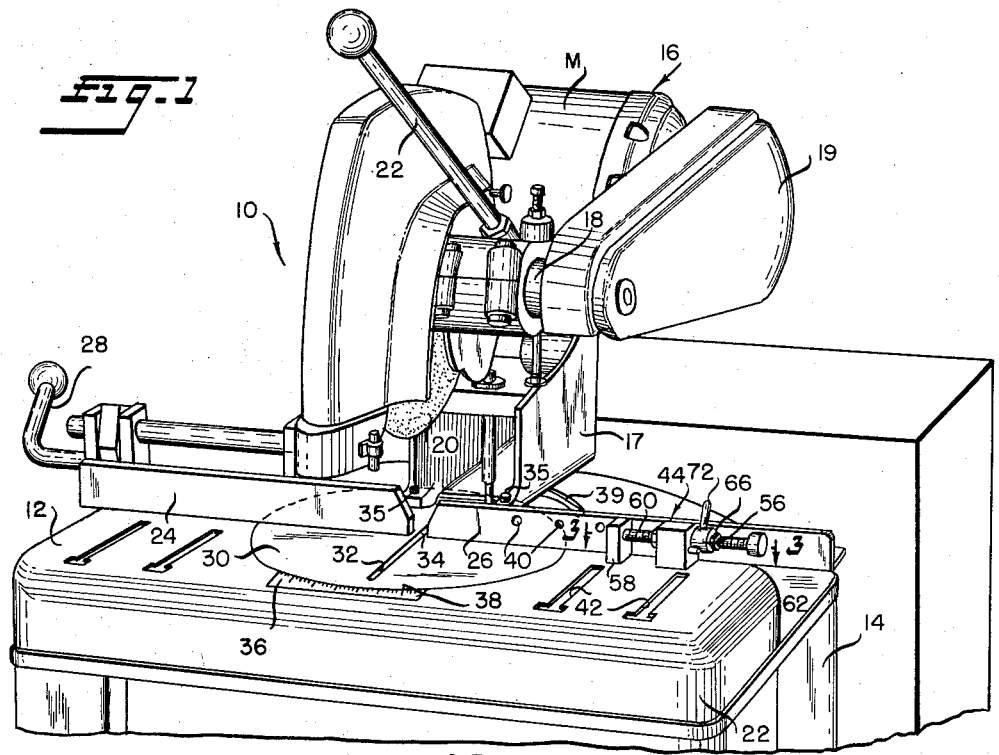
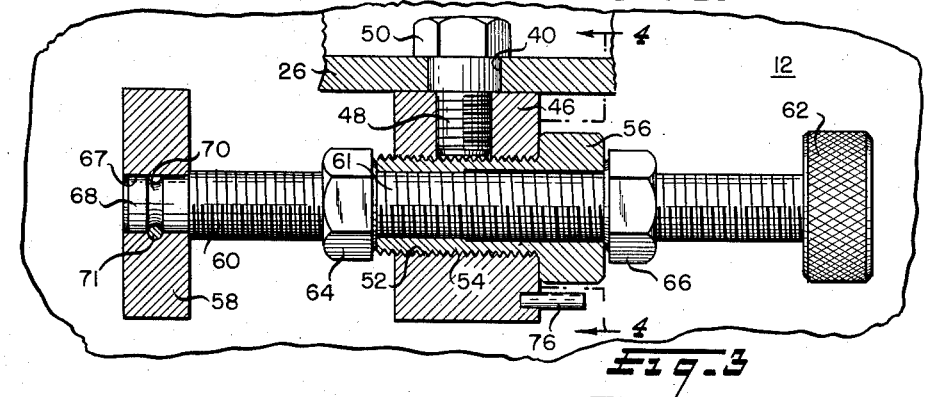
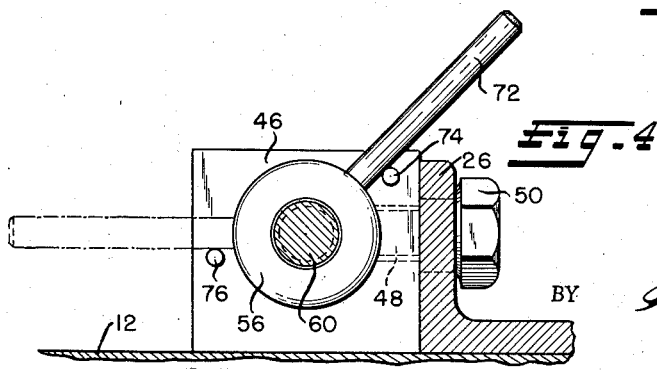
INVENTOR
Lester R. Born, Jr.
W. Dean Weikart
BY
ATTORNEYS July 2, 1963 L. R. BORN, JR., ETAL 3,095,673
WORKPIECE GAUGING STOP FOR METAL CUT-OFF MACHINE
Filed Aug. 9, 1961 3 Sheets-Sheet 2
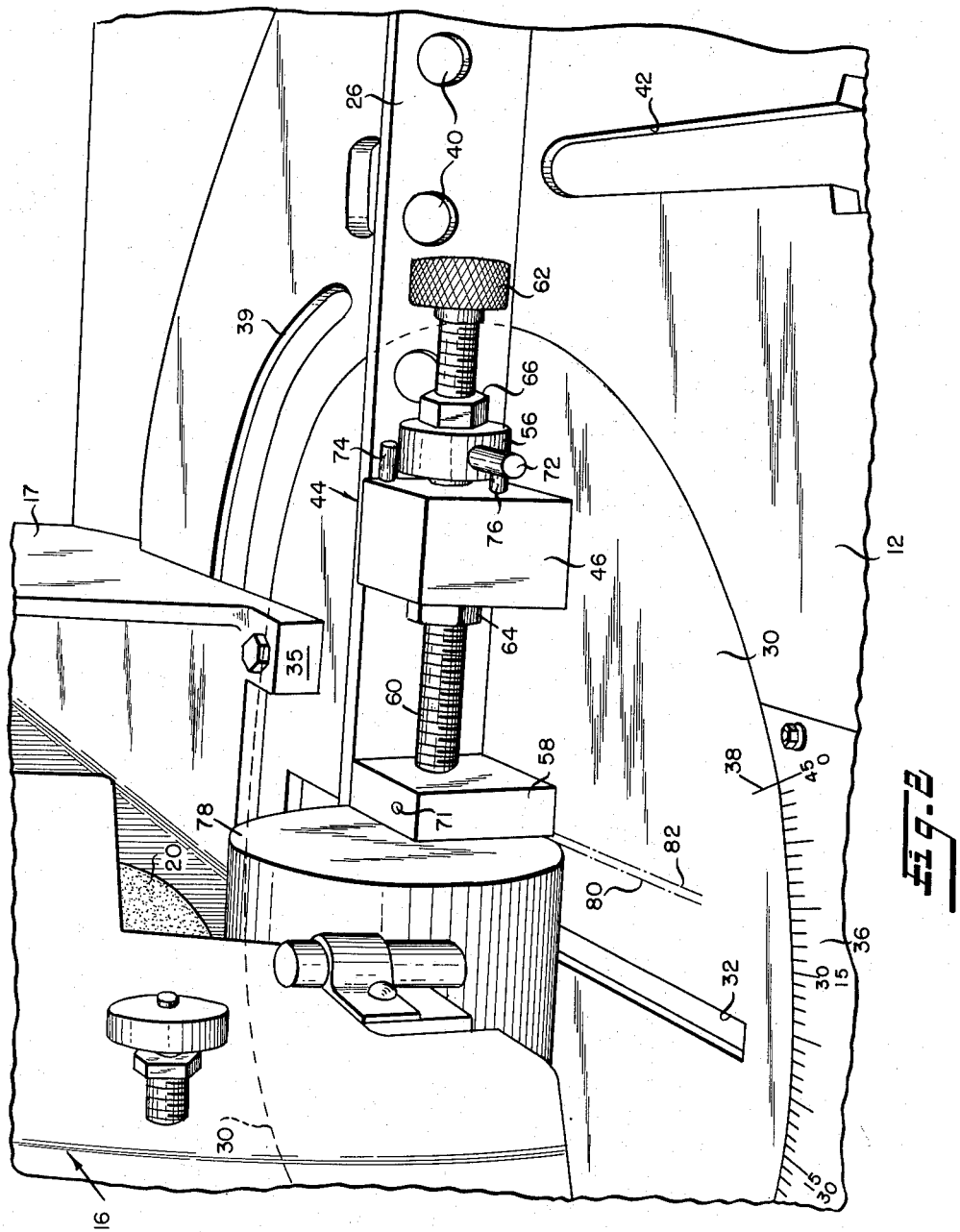
INVENTOR
Lester R. Born, Jr.
W. Dean Weikart
BY *Strauch, Nolan & Neale*
ATTORNEY July 2, 1963 L. R. BORN, JR., ETAL 3,095,673
WORKPIECE GAUGING STOP FOR METAL CUT-OFF MACHINE
Filed Aug. 9, 1961 3 Sheets-Sheet 3

INVENTORS
Lester R. Born, Jr.
W. Dean Weikart

BY

ATTORNEYS

United States Patent Office 3,095,673
Patented July 2, 1963

3,095,673
WORKPIECE GAUGING STOP FOR METAL CUT-OFF MACHINE
Lester R. Born, Jr., and Warren Dean Weikart, Bellefontaine, Ohio, assignors to Rockwell Manufacturing Company, Pittsburgh, Pa., a corporation of Pennsylvania
Filed Aug. 9, 1961, Ser. No. 130,375
18 Claims. (Cl. 51—98)

This invention relates to an improved metal cut-off machine, and more specifically to a novel work gauging stop member for a metal cut-off machine or saw.

The invention, though not limited thereto, finds particular application with a metal cut-off machine of the type disclosed in Patent No. 2,372,699 issued April 3, 1945 to Wiken and Boehnke. Cut-off machines of this type have a rotatable cutter blade or disk, which may be a toothed saw or a disk made of abrasive material suitably bonded to withstand operating conditions and commonly known as an "abrasive disk." The saw or disk is mounted to rotate with an arbor, which arbor, in turn, is supported on a pivotally mounted cradle to permit the cutter blade or disk to be moved across the path of the workpiece to be cut. The workpiece may be an indeterminate length of bar or stock from which predetermined lengths are to be severed. For this purpose, an end of the length of bar or stock is brought into contact with a stop member adjustably supported a predetermined distance from one side or face of the cutting edge of the cutter blade or disk, and the bar or stock is clamped in this position while the cradle is pivoted to bring the cutting edge of the cutter blade or disk across the workpiece to cut predetermined lengths therefrom.

These machines are designed to cut, at high speeds, various metals, such as stainless, high speed, knife blade, cold rolled, tool and other alloy steels, drill rods, wire rope, cast iron, angle iron, iron pipe, brake lining, ceramics, Duralumin, Tobin bronze, Navy bronze, and many other hard metals, cutting a square inch of steel in less than four seconds. A 12-inch cut-off machine, for example, can handle 4-inch channels, and solid round bars of 1020 steel up to about 3¼ inches in diameter. In the operation of machines of this type, considerable heat is generated in the vicinity of the cut, and a part of the heat is conducted along the metal workpiece on both sides of the cutter disk, producing a tendency for elongation of the workpiece. As the workpiece is usually clamped on the side of the cutter disk opposite to that occupied by the stop member, the tendency for elongation, resulting from heating, forces the free end of the workpiece against the unyielding stop member which prevents any actual elongation, but sets up, instead, internal strains between the clamp and the stop member which tend to bind the cutter blade or disk moving between the clamp and the stop member. This binding action places an undue load on the motor driving the disk which slows up the cutting action. Furthermore, this binding action produces more heat, and promotes the formation of burrs along the edges of the cut material and even breakage and injury of the cutter element itself.

It is an object of this invention, therefore to provide a novel stop member which completely eliminates the above-mentioned objectionable feature in the operation of prior art devices.

It is a further object to provide a novel stop member adapted for use with a metal cut-off machine which eliminates internal strains in the workpiece resulting from the action of the clamp and stop member in preventing elongation when the workpiece is heated by heat generated in the cutting operation.

It is a still further object to provide a novel stop member adapted for use with a metal cut-off machine which eliminates the binding effect of the workpiece on the cutting blade or disk resulting from the action of the clamp and stop member in preventing elongation when the workpiece is heated by heat generated in the cutting operation.

It is a still further object to provide a novel adjustable stop member which may be selectively adjusted to a preselected gauging position to enable the cutting of a workpiece to accurate predetermined lengths and which may be backed off from its gauging position, after clamping the workpiece and before initiating the cutting operation to permit unrestricted elongation of the workpiece during the cutting operation and return to its preselected gauging position upon completion of the cutting operation to accurately gauge successive workpiece lengths.

The above objects are obtained by a novel construction of a stop member having a combined adjusting means which can be readily and accurately set and locked in position, and a member by which the stop member can be readily backed off from contact with the end of the stock or bar of indeterminate length, after the latter has been properly located and clamped in position in the cut-off machine, before the cutting operation is initiated. The adjusting means and the back-off member are so related that the stop member can readily and accurately be restored to its initial or gauging position at the end of the cutting operation without affecting the adjustment of the adjusting means.

The manner of attainment of the above and other objects will become evident from a consideration of the following specification and appended claims in conjunction with the accompanying drawings, in which:

FIGURE 1 is a perspective view of the upper portion of a metal cut-off machine embodying the stop member of the instant invention;

FIGURE 2 is a perspective view of one embodiment of the novel stop member of the instant invention similar to the illustration in FIGURE 1 but drawn to a larger scale and illustrating the stop backed off from a measured workpiece length;

FIGURE 3 is a longitudinal sectional view of the novel stop member taken on the line 3—3 of FIGURE 1;

FIGURE 4 is an end view, with a portion thereof in section, of the novel stop member taken on the line 4—4 of FIGURE 3;

Figure 6:
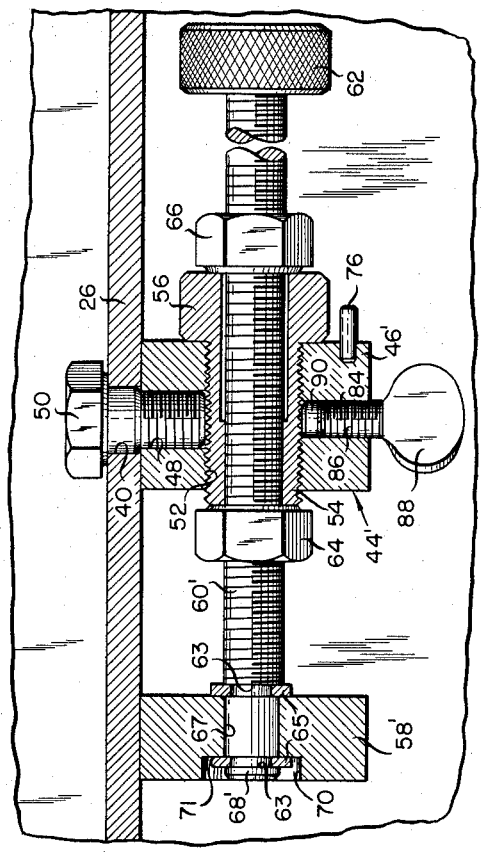
FIGURE 6 is a longitudinal sectional view on line 6—6 of FIGURE 5.

In the following description, in which the same reference numerals are employed to designate the same elements throughout the several views, the numeral 10 designates a metal cut-off machine of the type illustrated in the patent to Wiken and Boehnke, No. 2,372,699, issued April 3, 1945.

The cut-off machine includes, among a number of other features, a table 12 on which a workpiece is to be supported, the table being supported by a pair of end leg plates 14 having respective foot pads, one disposed at each corner. The table 12 pivotally supports, in a manner well known in the art and more fully disclosed in the aforesaid Letters Patent 2,372,699, a cutter assembly designated in its entirety by reference numeral 16. Cutter assembly 16 comprises a cradle mount 17 carried adjacent the rear edge of a circular table insert 30 disposed in laterally centered relation to the table side edges, a horizontal pivot (not shown) extending between the upstanding sidewalls of cradle mount 17, a support base having a cutter blade arbor 18 at its forward edge, and a drive motor M at its rear edge, a belt drive (not shown) extending between the motor M and arbor 18 within belt housing 19 and a cutter blade 20, illustrated as an abrasive disk. An actuator rod 22 is threaded into a boss on the support base and extends forwardly therefrom to a position within easy reach of an operator for manually moving the support base with its cutter disk downwardly around the horizontal pivot and across a workpiece positioned on the table against the biasing force of the counterbalanced motor M in well known manner.

A first fence portion 24 and a second fence portion 26 are adjustably supported on table 12 in axial alignment with one another with their inner ends overhanging table insert 30 to form a backing member for a workpiece when supported by the table. A work clamp 28, fully disclosed in the aforesaid Letters Patent 2,372,699, rigidly maintains a workpiece against the table 12 and the fence portions 24 and 26 during the cutting operation. The table insert 30 has a diametral slot 32 for receiving the edge of the cutter disk when the latter is lowered in a workpiece cutting operation. The adjacent ends of the fence portions 24 and 26 are disposed in spaced relation above table insert 30 to define a gap 34 coinciding with slot 32 for the passage of the cutter disk when lowered in a cutting operation.

As best seen in FIGURE 1, the forward corners of cradle 17 are provided with foot pads 35 which are bolted to circular insert 30 so that cradle 17 and its support base swivel around the center axis of table insert 30 to permit angle cuts to be made.

Adjacent the periphery of the circular insert the table 12 is provided with a scale 36 which is cooperable with one or more index marks 38 to determine the cutting angle of the cutter disk. A suitable clamp nut and bolt assembly (not shown) cooperates with an arcuate slot 39 formed in table 12 to fix cradle 17 and its support base in the desired adjusted position. The structure so far described is disclosed in the aforesaid Letters Patent 2,372,699 and is well known in the art.

The fence portion 26 is provided with a series of longitudinally spaced apertures 40 adapting the cut-off machine to receive the gauging stop of the present invention. The table is also provided with a number of slots 42, for securing thereto special guides or jigs for workpieces of unusual shapes.

The novel stop member forming the subject matter of this invention is designated in its entirety by the numeral 44 and comprises a support block 46 having a threaded blind bore 48 extending inwardly from its rear face by which it may be secured to the fence portion 26 by a cap screw 50 passing through one of the apertures 40 and threaded into bore 48. Any one of the apertures 40 may be used to mount block 46 and provide a rough positioning of the stop member at one side of disk 20. A fine adjustment of stop member 44 is provided by structure to be described later.

The support block 46 may be made of any desirable contour, but in the preferred form it is generally rectangular in cross section with its lower face resting firmly on the table 12 or the circular insert 30 and its right angularly related rear face firmly abutting the vertical front face of fence 26 as shown. The support block also includes a transverse threaded through bore 52 extending between its opposite side faces and intersecting the inner end of bore 48 to matingly receive an internally and externally threaded sleeve 54 having a cylindrical head 56 on one end thereof. As best shown in FIGURE 3, sleeve 54 between the head 56 and the other end thereof is slightly longer than the thickness of support block 46 so that a portion thereof projects beyond the left hand face of the block when head 56 seats against the right hand face of block 46, for a purpose to be explained hereinafter.

A threaded adjustment rod 60 of substantially greater length than sleeve 54 and having a knurled head 62 at one end is provided to cooperate with the internal threads of sleeve 54. Rod 60 carries at its other end an abutment stop element 58. Rod 60 adjacent one end of sleeve 54 threadedly receives a lock nut 66 and has its central shank portion 61 matingly engaged with the internal threads of sleeve 54. Adjacent the other end of sleeve 54, rod 60 threadedly receives a lock nut 64. The end of rod 60 carrying element 58 is provided with a reduced diameter plain tip 68 having an annular groove 70 and cooperating connector pin 71 adapting it to be rotatably associated with a through bore 67 in abutment stop element 58. The relative axial position of abutment stop element 58 to block 46 can be varied by rotating rod 60 in sleeve 54 to effect micrometer adjustment of abutment stop element 58 relative to the cutting plane of disk 20 and block 46 to accurately position stop element 58 to gauge a desired cut off length of bar stock. This adjustment, when completed, can be fixedly maintained by threading lock nuts 64 and 66 along rod 60 into tight abutting relation to the opposite ends of sleeve 54, as clearly shown in FIGURE 3, thereby fixing rod 60 and sleeve 54 for unitary threaded movement axially of the bore in block 46. Stop element 58, like block 46, has right angularly related bottom and rear faces respectively slidably engaging the surface of table 12 and the vertical face of fence 26 and a through bore, drive fittingly receiving the opposite ends of pin 71 to maintain the central portion of pin 71 in the groove 70 formed to have a free running fit therewith. It follows, therefore, that stop element 58 moves axially with rod 60 upon rotation of rod 60 alone or as a unit with sleeve 54.

The head 56 on the end of the sleeve 54 carries a radially projecting handle 72 within easy reach of an operator. The face of support block 46 abutted by head 56 carries a pair of angularly spaced stop pins 74 and 76 limiting rotary movement of the sleeve by alternately engaging handle 72 in positions spaced from the fence 26 and the table top to assure ready and easy grasping by the hand of the operator. FIGURE 2 illustrates the handle 72 engaged with stop pin 76 and establishing the cutting position of the stop member 44 with abutment stop element 58 backed off from the end of a workpiece 78, shown in the form a cylindrical steel rod. With the handle 72 in the uppermost position shown in FIGURE 1 in contact with the stop pin 74, the abutment stop 58 has been advanced toward its left hand position or gauging position. This latter position establishes a predetermined distance between the workpiece abutment face of stop element 58 and the adjacent face of the cutter 20 to assure an accurate cutting of a predetermined length.

Assuming the abutment stop to be in gauging position, the workpiece 78 is brought into position against the fence portions 24 and 26 and moved to the right to abut its end against abutment stop 58. The workpiece is then securely clamped in position by the clamp 28 against the fence portions and the top of the table 12 immediately below the cutter disk 20 and directly in its path of travel as it is lowered. The handle 72 is then grasped by the operator and swung forwardly until it is stopped by engagement with the pin 76, as shown in FIGURE 2 and in broken lines in FIGURE 4. The external threads on the sleeve 54 are right-handed so movement of the handle as described backs the abutment stop element 58 off toward the right away from engagement with the end of the workpiece. The broken line 80 in FIGURE 2 represents the intersection of the plane of the end of the workpiece with circular insert 30 while the broken line 82 in FIGURE 2 represents the intersection of the plane of the gauging face of abutment stop element 58 in its back-off position with circular insert 30. Thus, when the workpiece is cut, the elongation which results from the heat generated during the cutting process is unrestrained, and there are no internal strains within the workpiece which can interfere with the free operation of the cutter disk. When the workpiece has been cut and the cutter assumes its initial inoperative position, the severed piece may be removed and the handle 72 may be lifted to its initial gauging position shown in FIGURES 1 and 4, into engagement with the pin 74, whereupon the accurate gauging of the length of the next piece to be cut off may be effected preparatory to another cutting operation.

The internal threads and the external threads on the sleeve 54 may have the same pitch, but it is preferred that the external threads have a coarser pitch to permit sufficient back-off movement of abutment stop element 58 in the relatively small angular movement of the handle 72 between the positions shown in full lines and in broken lines in FIGURE 4. On the other hand, the internal threads in the sleeve may have a fairly fine pitch, to permit a micrometer adjustment of abutment stop element 58, which is possible in the arrangement shown since these threads are not subject to large strains as would occur if no back-off were provided. The provision of a sleeve 54 having a length in excess of the depth of the transverse bore 52 in the support block, as shown in FIGURE 3, provides an extension on the left hand end of the sleeve when the handle 72 is in its uppermost position as shown in FIGURE 4, and permits axial movement of the sleeve toward the right when the handle is moved to the position shown in FIGURE 2 to the back-off position of abutment stop element 58 without bringing the jam nut 64 into engagement with the side face of support block 46. The head 56 may contact the side of the support block 46 when the handle 72 is raised to its uppermost position as shown in FIGURE 4, but such contact should not interfere with the free operation of the sleeve 54.

Figure 5:
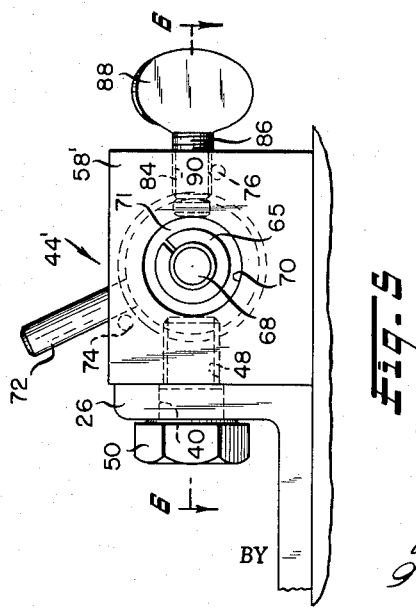
FIGURE 5 is an end view of a further embodiment of the novel stop member having a different form of retaining means for securing the abutment block on the adjusting rod, and having means to selectively lock the stop against movement.

In the embodiment of FIGURES 5 and 6, the parts corresponding to those in the first embodiment are designated by the same reference numerals, the stop member being designated in its entirety by the numeral 44', comprising a support block 46' having a threaded blind bore 48 extending forwardly from its rear face by which it may selectively be secured to the fence portion 26 by a cap screw 50 passing through any one of the apertures 40 and threaded into the bore 48 as previously described. As described above, the apertures 40 provide a rough positioning of the stop member 44' at one side of the disk 20, the fine adjustment being provided by structure similar to that previously described and similarly numbered. To this end, support block 46' includes a transversely extending threaded through bore 52 extending between its opposite faces and intersecting the inner end of the bore 48. The bore 52 matingly reecives an internally and externally threaded sleeve 54 having a cylindrical head 56 on one end thereof. The sleeve 54, between the head 56 and the other end thereof, is slightly longer than the thickness of support block 46' so that a portion of sleeve 54 projects beyond the left hand face of the block when the head 56 seats against the right hand face of the block 46' as shown in FIGURE 6.

A threaded adjustment rod 60' of substantially greater length than sleeve 54 and having a knurled head 62 at one end, cooperates with the internal threads of the sleeve 54. At its other end the rod 60' carries an abutment stop element 58'. A pair of lock nuts 64 and 66, threadedly mating with the threads on the rod 60', may be tightened against the opposite ends of the sleeve 54 to maintain the sleeve 54 and rod 60' in any desired adjusted position as previously pointed out. The end of the rod 60' opposite knurled head 62, is provided with a reduced diameter smooth tip 68' having a pair of axially spaced circumferential recesses 63 adapted to receive respective split rings 65. As seen in FIGURE 6, the tip 68' extends through a bore 67 in the stop element 58' into an end depression 70, the recesses 63 being spaced so that one ring 65 engages the right hand face of the stop element 58' defining one end of bore 67 while the other ring engages the bottom wall 71 of depression 70 defining the other end of bore 67 at the left hand or work engaging face of the stop element 58'. The reduced diameter tip 68' is designed of such length that its end does not project beyond the left hand or work engaging face of the stop element 58'. This construction permits relative rotation between the rod 60' and the stop element 58' while preventing relative axial movement.

As in the first described embodiment, the relative axial position of the abutment stop element 58' to block 46' can be varied by rotating the rod 60' in the sleeve 54 to effect micrometer adjustment of abutment stop element 58' relative to the cutting plane of disk 20 and block 46' to accurately position the stop element 58' to gauge a desired cut off length of bar stock. Such adjustment, when made, can be fixedly maintained by threading the lock nuts 64 and 66 along rod 60' into tight abutting relation to the opposite ends of sleeve 54 thereby fixing rod 60' and sleeve 54 for unitary movement axially of the bore in the block 46'. Similarly to the first embodiment, the stop element 58' and block 46' have right angularly related bottom and rear faces respectively slidably engaging the surface of table 12 and the vertical face of fence 26. A running fit of the tip 68' within the bore 67 in the stop element 58', and the engagement of the split rings 65 with opposite face areas of the stop element 58', assure axial movement of the stop element 58' with rod 60' upon rotation of the rod 60' alone or as a unit with sleeve 54.

The head 56, as in the previous embodiment, carries a radially projecting handle 72 within easy reach of an operator. The face of support block 46' opposing head 56 carries a pair of angularly spaced stop pins 74 and 76 limiting rotary movement of the sleeve 54 by alternately engaging handle 72 in positions spaced from the fence 26 and the table top to assure ready and easy grasping by the hand of the operator.

There is also provided a lock for the stop member which may be set to prevent accidental or unintentional operation thereof when the cut-off machine is used to cut sections from a workpiece which presents no problem of thermal elongation when being cut, such as, for example, wood, ceramics, and other poor heat conducting materials. To accommodate such a lock, block 46' is provided with a threaded bore 84 extending rearwardly from the front face of the support block 46' to intersect the transversely extending bore 52. The threaded bore 84 receives a clamp screw 86 having a wing or flattened end 88 to enable manual turning of the screw. A plug 90 of relatively soft metal is interposed between the inner end of the screw 86 and the threaded exterior of the sleeve 54, whereby clamping operation of screw 86, threading of the screw inwardly, forces the soft metal plug 90 against the threaded exterior of the sleeve 54 to lock the latter against rotation. The relatively soft metal plug will yield against the harder threaded exterior of the sleeve 54 obviating damage to the threads on the latter.

The operation of the second embodiment is identical with the operation of the first embodiment described above. When the device is operated so that the stop member is backed off from the end of the workpiece before cutting, the lock action provided by screw 86 and plug 90 is rendered ineffective by manually turning the screw 86 in an outward direction to relieve the clamping pressure against the plug 90.

It should be understood that the lock means illustrated in connection with the embodiment of FIGURES 5 and 6, can also be used in connection with the first embodiment for the same purpose.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. For use with a metal cut-off machine having a supporting table and a workpiece guide fence against which a workpiece may be held in fixed position on the table while being cut, a work stop adapted for selective positioning along the guide fence, comprising: a support block adapted for attachment to a fixed part of the cut-off machine; an abutment stop adapted to contact an end of a workpiece to predetermine the length thereof to be cut; means to adjust the position of the abutment stop relative to the support block; means to lock said adjusting means in adjusted position; and back-off means, carrying said adjusting means and cooperable with said support block, operable to back-off said abutment stop from contact with the end of a workpiece without affecting the adjustment of said adjusting means.

2. For use with a metal cut-off machine having a supporting table and a workpiece guide fence against which a workpiece may be held in fixed position on the table while being cut, a work stop adapted for selective positioning along the guide fence, comprising: a support block for attachment to a fixed part of the cut-off machine and having a tranversely extending threaded bore; an internally and externally threaded sleeve, the external threads thereof matingly engaging said threaded bore; an abutment stop; means, adjustably positioning said abutment stop relative to said support block, including an externally threaded member carrying said abutment stop, said external threads on said threaded member matingly engaging the internal threads in said sleeve.

3. A work stop as defined in claim 2, including means rotatably mounting said abutment stop on one end of said threaded member.

4. A work stop as defined in claim 2, including a knurled head at one end of said threaded member, and a pair of jam nuts on said threaded member, one jam nut engaging one end of said sleeve and the other jam nut engaging the other end of said sleeve to lock said sleeve and threaded member in adjusted position.

5. A work stop as defined in claim 2, including manually operable means to rotate said sleeve to back-off said abutment stop relative to the end of a workpiece.

6. A work stop as defined in claim 2, in which said sleeve includes a head on one end thereof, and a manually operable means attached to said head to effect rotary movement of said sleeve and concomitant axial movement of the abutment stop.

7. A work stop as defined in claim 2, in which said sleeve includes a head on one end, the length of the externally threaded portion between said head and the other end of the sleeve being longer than the thickness of said support block.

8. A work stop as defined in claim 2, in which said sleeve includes a head on one end thereof, manually operable means attached to said sleeve to rotate said sleeve to cause concomitant axial movement of the sleeve and the abutment stop in one direction to back off the abutment stop relative to the end of a workpiece, and to cause axial movement in the other direction to move the abutment stop to a gauging position, and a pair of fixed stops engageable with said manually operable means to limit the rotary movement of the sleeve in both directions.

9. A work stop as defined in claim 2, including means rotatably mounting said abutment stop on one end of said externally threaded member, said last mentioned means comprising a plane tip on the end of said threaded member having a circumferential groove, and a through bore in said abutment stop receiving said tip and a connector pin carried by said abutment stop and engaging said circumferential groove to prevent relative axial movement between said abutment stop and said threaded member while permitting relative rotational movement.

10. A work stop as defined in claim 2, including means rotatably mounting said abutment stop on one end of said externally threaded member, said last mentioned means comprising a plane tip on the end of said threaded member having a pair of axially spaced circumferential grooves, a through bore in said abutment stop receiving the portion of said tip lying between said spaced grooves and a split ring, in each groove, engaging opposite faces of said abutment stop to prevent relative axial movement between said abutment stop and said threaded member while permitting relative rotational movement.

11. A work stop as defined in claim 10, in which the work engaging face of the abutment stop includes a counterbore in which one of said split rings is housed.

12. A work stop as defined in claim 2, including lock means grippingly cooperating with said sleeve to prevent accidental or unintentional rotation thereof in said threaded bore of said support block.

13. A work stop as defined in claim 2, including lock means grippingly cooperating with said sleeve to prevent accidental or unintentional rotation thereof in said threaded bore of said support block, said lock means comprising a second threaded bore in said support block intersecting said threaded bore, a screw matingly engaging said intersecting threaded bore, and a plug of relatively soft material interposed between the inner end of said screw and the exterior of said threaded sleeve.

14. In combination with a metal cut-off machine having a work support table, a work guide fence secured to said table to position a workpiece in position for cutting and a cutter assembly including a cutter element movable between a normal inoperative position and a cutting position; a workpiece gauging stop comprising a support member fixedly secured to said fence to one side of said cutter element; a primary support means mounted on said support member for incremental movement toward and away from said cutter element to establish a gauging position and a back-off position; abutment stop means adjustably mounted on said primary support means for micrometric relative movement to a predetermined distance from said cutter element; means for locking said abutment stop means against movement relative to said primary support means to establish an abutment stop for gauging a length of a workpiece to be cut-off; and means for imparting incremental movement to said primary support means to shift said abutment stop between gauging position and back-off position whereby free thermal expansion of said length of workpiece to be cut-off is permitted during the cutting position to avoid binding of said cutting element.

15. The combination of claim 14 wherein said means for imparting incremental movement to said primary support means comprises a threaded connection between said support member and said primary support means; a pair of stop pins mounted in a face of said support member in angularly spaced relation along an arcuate path coaxially related to said threaded connection; and a radially extending actuator rod fixed at one end in said primary support means and adapted to move between said pair of stop pins upon relative threaded movement of said support means and said support member, said actuator rod having a radial extension forming a hand hold to be grasped by an operator to impart threaded movement to said support means.

16. The combination of claim 14 wherein said abutment stop means includes a rod having a threaded connection with said primary support means; releasable lock nut means for locking said rod and said primary support means for unitary movement with said primary support means; and an abutment block rotatably secured to an end of said rod and having table and fence engaging faces assuring non-rotating sliding engagement between said abutment block and said table and fence.

17. An adjustable gauging stop for use on a metal cut-off machine having a workpiece support table and a fixedly related guide fence comprising a support block having angularly related faces for engaging said workpiece support table and guide fence and a threaded through bore paralleling said angularly related faces; securing means for fixedly securing said support block to said guide fence; an externally and internally threaded sleeve threaded into said threaded through bore with its opposite ends protruding from the opposite ends of said through bore; an externally threaded rod threaded into said sleeve with its opposite ends protruding from said sleeve bore and respectively formed to provide an enlarged actuating head and a reduced diameter tip having an annular groove disposed between its opposite ends; respective lock nuts threaded on the protruding portions of said rod and adapted for use as jam nuts to engage the opposite ends of said sleeve and lock said sleeve and rod for unitary threaded movement in said bore of said support block; an abutment block rotatably mounted on said reduced diameter rod end and having a through bore therein intersecting the annular groove of said rod; a securing pin disposed with its opposite ends in said through bore of said abutment block and its midportion in said annular groove to fix said block against relative axial movement along said reduced diameter rod end; a radially extending actuating rod having one end fixed in a protruding end of said sleeve and its opposite end extending beyond the side faces of said support block to form a hand hold adapted to be grasped by an operator to effect relative threaded movement of said sleeve in said support block axially between a normal gauging position and a back-off position; and stop pins fixed in a face of said support block in angular spaced relation to the axis of rotation of said sleeve and extending therefrom into the path of movement of said actuating rod to respectively determine the gauging position and back-off position of said sleeve.

18. The gauging stop of claim 17 wherein said securing means for fixedly securing said support block to said guide fence comprises a stepped shank headed bolt having an enlarged shank portion adjacent said head to freely cooperate with a selected one of several longitudinally spaced openings in the guide fence and a threaded shank end adapted to threadedly engage a threaded bore extending through the fence engaged face of said support block.

References Cited in the file of this patent
UNITED STATES PATENTS

| | | |
|---|---|---|
| 2,247,305 | Morgan | June 24, 1941 |
| 2,354,509 | Dreher | July 25, 1944 |
| 2,372,699 | Wiken et al. | Apr. 3, 1945 |